CARTRIDGE AND REEL ALIGNMENT MEANS
Filed Nov. 24, 1967
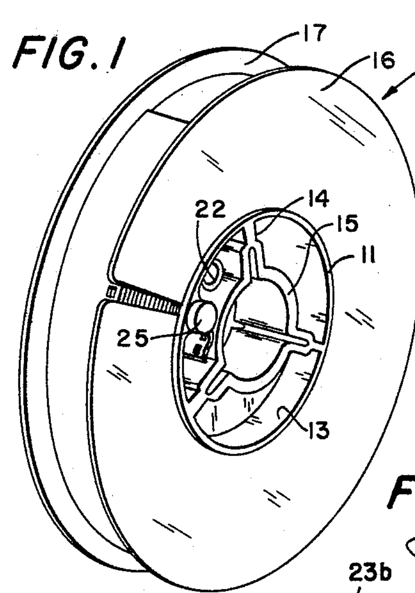
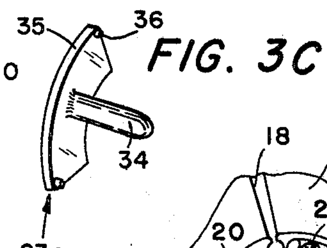
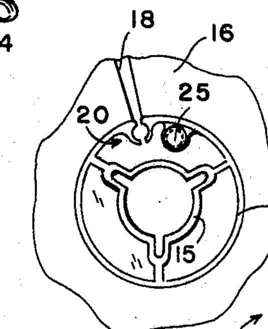
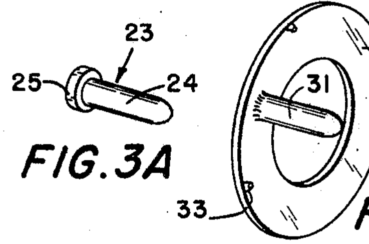
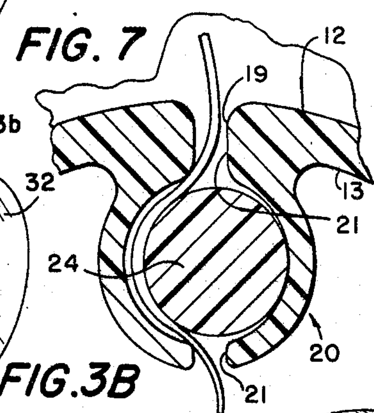
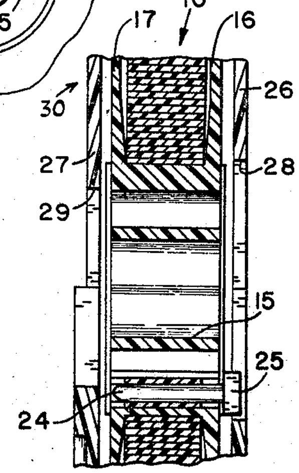
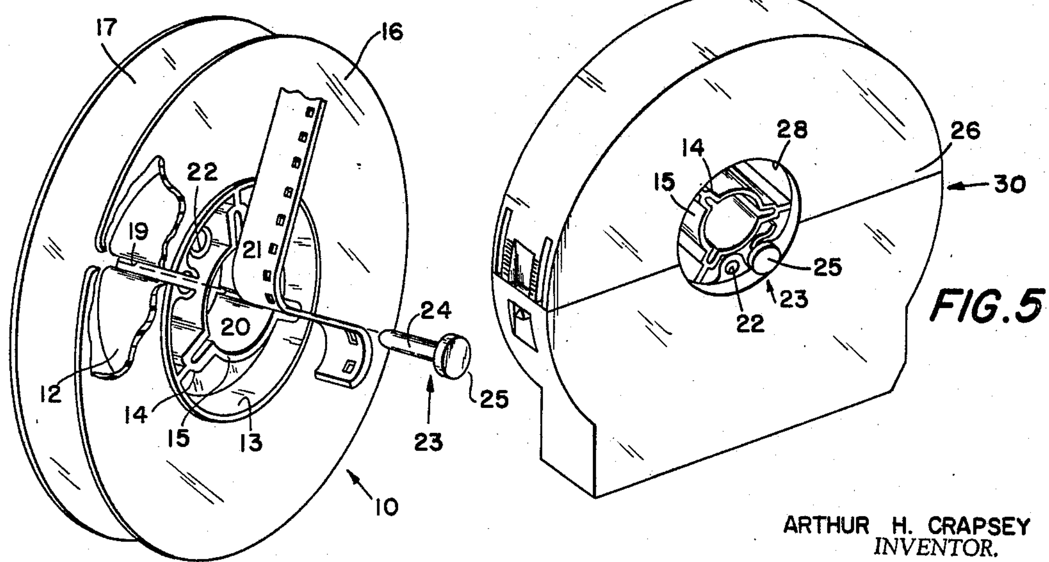
ARTHUR H. CRAPSEY
INVENTOR.

United States Patent Office 3,491,965

Patented Jan. 27, 1970

3,491,965

CARTRIDGE AND REEL ALIGNMENT MEANS

Arthur H. Crapsey, Rochester, N.Y., assignor to Eastman Kodak Company, Rochester, N.Y., a corporation of New Jersey Filed Nov. 24, 1967, Ser. No. 685,597
Int. Cl. B65h *75/28*
U.S. Cl. 242—74.1 9 Claims

ABSTRACT OF THE DISCLOSURE

A retaining pin is provided for releasably retaining the end portion of a web to a reel therefor, and for preventing improper orientation of the reel when it is placed in a cartridge or other compartment. The end portion to be retained is inserted into a slot of a sleeve formed in the reel hub. The retaining pin is inserted into the sleeve to engage and resiliently bend the web end portion around the sleeve wall.

CROSS-REFERENCE TO RELATED APPLICATION

Reference is made to commonly assigned copending U.S. patent application Ser. No. 685,589, entitled Reel and Web Retaining Means Therefor, filed in the name of Morris E. Brown on Nov. 24, 1967; commonly assigned U.S. application Ser. No. 685,615, entitled Reel With Attached Film Retaining Means, filed in the name of James J. Wenskus on Nov. 24, 1967; commonly assigned U.S. application Ser. No. 685,631, entitled Reel and Film Retaining Means filed in the name of Evan A. Edwards et al. on Nov. 24, 1967; and commonly assigned U.S. application Ser. No. 685,588, entitled Cartridge, filed in the name of John J. Bundschuh on Nov. 24, 1967 and based on the last of these applications Ser. No. 685,588, a continuation-in-part application Ser. No. 736,524 was filed on May 23, 1968.

BACKGROUND OF THE INVENTION

The present invention relates to retaining means for releasably retaining the end portion of an elongated web, such as a motion picture film, to a reel or other storage device, and to means for insuring proper orientation of a reel within a cartridge.

In the motion picture field, it is well known to place film in a cartridge and to use the cartridge in a movie camera which will expose the film and return it to the cartridge without requiring any direct handling of the film by the operator. More recently, motion picture projector systems have been developed wherein film to be projected is wound on a reel contained in a cartridge, and a mechanism automatically removes the film from the cartridge for projection and rewinds it into the cartridge when projection is completed. Such a projector is disclosed in commonly assigned copending U.S. application Ser. No. 685,616, entitled Cinematographic Projectors or the Like and Cartridges For Use Therewith, filed in the names of John J. Bundschuh et al. on Nov. 24, 1967. In a projector system of this type, the trailing end portion of film may be secured to the hub of the reel by a film retaining device, and an automatic rewind cycle may be activated in response to the increase in film tension when the projector feed mechanism attempts to pull the film end from the reel.

One typical prior art film retaining device is disclosed in commonly assigned U.S. Patent No. 3,300,155, to Robert J. Roman entitled Automatic Rewind Mechanism For Film or the Like, and takes the form of a spring clip which is slipped over the end of the film within the hub of a supply reel. While such a clip serves its intended purpose, it has several drawbacks. It is small and easy to lose, especially if the supply reel is shipped to the consumer without film thereon to which the clip can be attached. Furthermore, the clip is difficult to manufacture with a uniform spring tension which must be stiff enough to hold the film securely, yet resilient enough to permit easy positioning on the film end.

Another known film retaining device comprises a sleeve separate from the reel and having a film receiving slot therein. A pin is adapted to be positioned in the sleeve. In this device, the sleeve is placed over the edge of the film so that the film passes therethrough by way of the slot. The pin is then pushed into the sleeve to deflect and confine the film between the pin and the inside wall of the sleeve. In use, the film end is passed through an opening in the reel hub whereupon the retaining device is attached to the film end within the hub to prevent withdrawal of the film end and thus secure the same to the hub. This device also has several drawbacks. As with the previously described clip, the small parts forming the retaining device are easily lost. And the pin and sleeve, being separate parts, require separate manufacturing and handling steps. Moreover, in use the small sleeve must carefully be held within the hub while the pin is being inserted.

SUMMARY OF THE INVENTION

In the disclosed embodiment of the invention, a socket having a slot therein is formed in a reel. The film end portion is inserted in the slot and a pin is inserted in the socket to bend and frictionally retain the film between the pin and socket. Optionally, a second socket is formed in the reel to receive and store the pin when it is not in use. When the reel is to be contained within a cartridge the end of the pin is extended so that the end thereof serves to prevent insertion of the reel into the cartridge if the reel is improperly oriented relative to the cartridge. Other features and advantages will become apparent from the following description taken in connection with the accompanying drawing.

BRIEF DESCRIPTION OF THE DRAWING

In the accompanying drawing:

FIG. 1 is a perspective view of a reel having a web or film retaining means in accordance with the invention;

FIG. 2 is a fragmentary front elevation of the reel structure with the retaining pin in its storage position;

FIG. 3A is an enlarged perspective view of the retaining pin shown in FIG. 1;

FIGS. 3B and 3C are enlarged perspective views illustrating different embodiments of the retaining pin;

FIG. 4 is an exploded perspective view of the reel with a portion broken away, to illustrate the manner in which the film retaining means is used;

FIG. 5 is a perspective view of the reel in a cartridge;

FIG. 6 is a fragmentary sectional view of the parts shown in FIG. 5; and

FIG. 7 is an enlarged cross sectional view of the retaining pin and retaining sleeve shown in FIG. 4 illustrating the manner in which a film is retained thereby.

DESCRIPTION OF THE PREFERRED EMBODIMENTS

Referring to the drawing, there is shown a film supply reel 10 adapted to be contained within a cartridge 30. The supply reel 10 comprises a generally hollow hub 11 having an annular outer surface 12 on which film is wound and having an inner surface 13. A plurality of arms 14 extend radially inwardly from the inner surface 13 to a core portion 15 having a suitable central opening adapted to receive a spindle (not shown). A pair of spaced side flanges 16 and 17 extend radially outwardly from the hub 11 to guide successive convolutions of film onto the hub. Side flange 16 is provided with a break 18 therein in alignment with a film threading slot 19 in the hub 11 such that the end portion of a film or web can be threaded into the slot 19.

The reel structure may comprise an integrally molded part of plastic material. Since the particular reel configuration thus far described and the method of molding the same are well known in the art, further description is deemed unnecessary.

In the disclosed embodiment, a socket, which takes the form of a sleeve 20 having an axial slot 21, is attached to the reel 10 such as by integrally molding the sleeve with the reel hub on inner surface 13. The retaining sleeve 20 is located on the inner surface 13 such that the two semi-circular halves of sleeve 20, separated by slot 21, are circumferentially aligned on opposite sides of film threading slot 19.

Circumferentially spaced from retaining sleeve 20, but also on inner surface 13, of core 11, is a storage socket or sleeve 22, the purpose of which will become more apparent hereinafter.

Referring to FIG. 3A of the drawing there is shown one embodiment of a retaining pin identified generally by the reference numeral 23 which is adapted to be slidably received by sleeve 20 and to cooperate therewith to retain the end of a film to the hub 11. More specifically, the pin 23 may comprise an elongated rigid body portion 24 having a tapered end and a head portion 25. Head portion 25 may simply comprise an enlarged extension of body portion 24 or may comprise a separate part suitably atached thereto. The body portion of pin 23 has a diameter generally complemental to that of the sleeve 22 to be frictionally retained therein during storage.

In operation, the end of a film is inserted into film threading slot 19 and between the semi-circular halves of retaining sleeve 20 as shown in FIG. 4. Elongated body portion 24 of pin 23 is then inserted into retaining sleeve 20 such that the film is resiliently deformed and frictionally held between the pin and the wall of one semi-circular half of sleeve 20 to thereby retain the film to the reel as shown in FIG. 7. If, for example, the pin body portion 24 has a diameter of .110 inch, the inner diameter of the sleeve is .125 inch and the width of the slot is .020 inch, the retaining means will adequately retain a film having a thickness of .005 inch without permanently deforming or bending the film. When the retaining pin is not in use, as when the reel is used with a projector without automatic rewind, the pin 23 may be stored in socket 22 to prevent loss of the pin.

Referring more particularly to FIGURES 5 and 6, the cartridge 30 comprises a two-part casing adapted to contain the reel 10 and generally defining side walls 26 and 27 having central openings 28 and 29, respectively, through which the spindle (not shown) of a projector may extend. As described in copending application Ser. No. 685,588, the cartridge 30 may be provided with indexing surfaces whereby the cartridge can only be mounted on a projector in a predetermined position of orientation. The opening 28 of the side wall 26 has a larger diameter than the opening 29 in side wall 27. In addition, opening 28 has a radius which exceeds the distance between the rotational axis of reel 10 and the outermost edge of head portion 25 of retaining pin 23, such that pin 23 will freely orbit within opening 28 when reel 10 is rotated by the projector spindle in cartridge 30. Opening 29, on the other hand, has a smaller radius than the distance between the reel axis and the outermost edge of head portion 25. Thus, interference will result between head 25 of pin 23 and the cartridge surfaces if it is attempted to position the reel in the cartridge when the reel is improperly oriented relative to the cartridge.

Referring to FIG. 3B of the drawing, another embodiment of the retaining pin, identified by the reference numeral 23*b*, comprises a pin body portion 31 having a head portion 32 in the form of a washer-shaped disk which serves as a cover for the annular space between the reel hub and core. The diameter of disk 32 is substantially equal to that of opening 28 so that disk 32 will freely rotate within opening 28 if the reel 10 is properly oriented in cartridge 30. If the reel 10 is not properly oriented, interference will occur between disk 32 and the smaller diameter opening 29 to prevent complete insertion of the reel 10 in the cartridge.

The washer 32 may be provided with suitable abutments or dimples 33 which are spaced and positioned to fit between two of the arms 14 in engagement therewith to provide an alignment means which facilitates positioning of the washer 32 concentrically with hub 11.

Still another embodiment of the retaining pin is depicted in FIG. 3C. This embodiment, identified by the reference numeral 23*c* comprises a pin body portion 34 having a head portion 35 comprising an arcuate segment of a washer similar to that depicted in FIG. 3B. The washer segment 35 has a radius also related to the radii of openings 28 and 29 such that interference will result if the reel 10 is improperly oriented in the cartridge 30. Spaced dimples 36 may also be provided to position the washer segment 35 concentrically with the heel hub. The FIG. 3C embodiment thus functions similar to the FIG. 3B embodiment.

The invention has been described in detail with particular reference to preferred embodiments thereof, but it will be understood that variations and modifications can be effected within the spirit and scope of the invention as described hereinabove and as defined in the appended claims.

I claim:

1. In a web storage means including a cartridge and a reel adapted to be received in the cartridge, wherein the reel has a hub and side flanges, the improvement comprising:
   abutment means on the reel extending beyond said side flanges; and
   means on the cartridge cooperative with said abutment means for permitting substantially free rotation of the reel in the cartridge only when the reel is properly oriented in the cartridge.

2. In a reel and cartridge assembly wherein the reel has a hub defining an outer surface for receiving an elongated web wound thereon and a central portion adapted to receive a spindle, and wherein the cartridge has spaced side walls adapted to receive the reel therebetween and to permit rotation of the reel relative to the cartridge, the improvement comprising:
   abutment means extending outwardly from said hub; and
   an opening in one side wall of said cartridge for receiving said abutment means when the reel is properly oriented in the cartridge to thereby permit insertion and free rotation of the reel in the cartridge only when the reel is properly oriented in the cartridge.

3. In a web storage device, the combination comprising:
   a hollow hub adapted to have a web wound thereon and having a threading slot through a wall thereof for threading the end portion of the web into the interior of said hub;
   elongated socket means within said hub comprising first and second elongated parts, said first part being attached to said hub adjacent one side of side of said threading slot and said second part being attached to said hub adjacent the other side of said slot, said parts being spaced to receive the end portion of the web therebetween;
   an elongated retaining member adapted to be inserted between said parts to frictionally retain the end portion of the web between said retaining member and at least one of said parts, said retaining member having a portion extending axially beyond the hub on only one side of the hub; and a cartridge, adapted to receive said hub with the web wound thereon, and having first and second sides, said first side having an opening therein for receiving said extending portion of said retaining member when said reel is properly oriented in said cartridge, said second side defining a surface adapted to interfere with said extended portion when said reel is improperly oriented in said cartridge.

4. In a reel and cartridge assembly wherein the reel has a hub for receiving an elongated web wound thereon and the cartridge has spaced side walls and a circular opening in one of the side walls, the improvement comprising:

abutment means on one side of said hub member adapted to be received in said circular opening when said reel is properly oriented in the cartridge and to orbit in said opening about the rotational axis of said reel during rotation of said reel in the cartridge.

5. In a reel and cartridge assembly, wherein the reel is adapted to have film wound thereon and is adapted to be mounted on a spindle for rotation within the cartridge, and wherein the cartridge has side walls for receiving the reel for rotation therebetween, the improvement wherein one of the side walls of the cartridge defines an opening, and wherein the reel comprises:

a hub member having radial flanges extending therefrom;

a socket within said hub member adapted to have the end portion of the film threaded therein;

a retaining member adapted to be positioned in said socket to frictionally engage and retain the end portion of the film within said socket; and abutment means on said retaining member adapted to be received in the side wall opening of the cartridge when the reel is properly oriented in the cartridge, said abutment means preventing insertion of the reel into the cartridge when the reel is improperly oriented in the cartridge.

6. An assembly as claimed in claim 5 wherein said retaining member comprises an elongated pin and said abutment means comprises a head portion on said pin.

7. An assembly as claimed in claim 5 wherein said retaining member comprises an elongated pin and said abutment means comprises a washer shaped head portion on said pin having a diameter complemental to that of the side wall opening to be received therein and to rotate therein during rotation of the reel.

8. An assembly as claimed in claim 5 wherein said retaining member comprises an elongated pin and said abutment means comprises a head portion on said pin of arcuate configuration and having a radius complemental to that of the side wall opening to be rotatable within the side wall opening during rotation of the reel within the cartridge.

9. A reel and cartridge assembly, said reel comprising: a circular hub portion, a socket in the hub portion radially spaced from the rotational axis of the hub portion and adapted to have a film end portion threaded therein, a retaining member for insertion into the socket to frictionally engage and retain the film end portion therein, and a head portion on the end of the retaining member, the reel being rotatable by a drive spindle within said cartridge, said cartridge comprising: a casing having spaced side walls adapted to receive the reel between said side walls; concentric circular openings in said side walls respectively having different radii, at least one of which is adapted to receive the spindle; the radius of the largest size opening being complemental to the radial spacing of the socket from the rotational axis of the reel whereby the head portion is received by and rotatable within said larger size opening when the reel is properly oriented in said cartridge; and the smaller size opening having a radius smaller than the radial spacing of the socket from the rotational axis of the reel to prevent insertion of the reel improperly oriented in the cartridge.

References Cited

UNITED STATES PATENTS

| | | | |
|---|---|---|---|
| 2,153,573 | 4/1939 | Kinloch | 242—71.1 |
| 2,575,024 | 11/1951 | Mihalyi | 242—71.1 X |
| 3,220,665 | 11/1965 | Modrey | 242—74.1 |
| 3,312,413 | 4/1967 | Bernstein | 242—74.2 |

NATHAN L. MINTZ, Primary Examiner

Disclaimer 3,491,965.—*Arthur H. Crapsey*, Rochester, N.Y. CARTRIDGE AND REEL ALIGNMENT MEANS. Patent dated Jan. 27, 1970. Disclaimer filed Mar. 10, 1971, by the assignee, *Eastman Kodak Company*.

Hereby enters this disclaimer to claims 1, 2 and 4 of said patent.

[*Official Gazette June 8, 1971.*]